United States Patent
Kitani et al.

[11] Patent Number: 6,056,329
[45] Date of Patent: May 2, 2000

[54] TELESCOPIC PIVOTAL PIPE JOINT

[75] Inventors: Kenji Kitani, Higashiosaka; Shintaro Suzuki; Kosuke Sakai, both of Sanda, all of Japan

[73] Assignee: Waterworks Technology Development Organization Co., Ltd., Japan

[21] Appl. No.: 09/053,506

[22] Filed: Apr. 1, 1998

[30] Foreign Application Priority Data

Apr. 8, 1997 [JP] Japan .................................. 9-089392
Apr. 9, 1997 [JP] Japan .................................. 9-090500

[51] Int. Cl.⁷ .................................................. S16L 27/04
[52] U.S. Cl. ........................ 285/145.3; 285/261; 285/302; 285/906
[58] Field of Search .................................. 285/FOR 147, 285/FOR 148, FOR 149, 263, 261, 146.2, 145.3, 302, 145.1, 906

[56] References Cited

U.S. PATENT DOCUMENTS

| | | | |
|---|---|---|---|
| 290,196 | 12/1883 | Abel | 285/145.3 |
| 407,671 | 7/1889 | Leland | 285/145.3 |
| 2,502,753 | 4/1950 | Rohr | 285/302 X |
| 3,306,636 | 2/1967 | Hereth | 285/94 |
| 3,427,051 | 2/1969 | White et al. | 285/302 X |
| 4,486,037 | 12/1984 | Shotbolt | 285/263 X |
| 4,776,617 | 10/1988 | Sato | 285/145.3 |

FOREIGN PATENT DOCUMENTS

| | | | |
|---|---|---|---|
| 2563316 | 10/1985 | France | F16L 27/02 |
| 4-66486 | 6/1992 | Japan | F16L 27/06 |
| 5-66394 | 9/1993 | Japan | F16L 27/04 |
| 524935 | 8/1940 | United Kingdom | 285/302 |
| 2066399 | 7/1981 | United Kingdom | F16L 27/04 |

*Primary Examiner*—Dave W. Arola
*Attorney, Agent, or Firm*—Webb Ziesenheim Logsdon Orkin & Hanson, P.C.

[57] ABSTRACT

A telescopic pivotal pipe joint for use in a fluid transporting pipe system such as water transporting pipe system installed under the ground is disclosed. The joint has a first pipe member including a semi-spherical inner peripheral face, a second pipe member including a semi-spherical pipe portion projecting radially outward and sidable along the semi-spherical inner peripheral face of the first pipe member, the second pipe member being slidably engaged within the first pipe member, and a third pipe member telescopically sidable in an axial direction and engaged on a straight pipe portion co-extensive with the semi-spherical pipe portion of the second pipe member. The semi-spherical pipe portion of the second pipe member defines an annular groove, into which one end of the third pipe member comes into engagement along the axial direction when the second pipe member and the third pipe member are contracted maximally relative to each other.

14 Claims, 8 Drawing Sheets

TELESCOPIC PIVOTAL PIPE JOINT

BACKGROUND OF THE INVENTION

1. Field of the Invention

The present invention relates to a telescopic pivotal pipe joint, and more particularly to a telescopic pivotal pipe joint for use in a fluid transporting pipe system such as water transporting pipe system installed under the ground, the pipe joint being capable of absorbing as much as external force such as an axial compression stress or tensile stress resulting from an earthquake or differential settlement of the earth or a shearing force or bending moment in a direction transverse to the axis of the pipe, thereby precluding the possibility of breakage of weak portions of the pipe system.

2. Description of the Related Art

Figure 9:
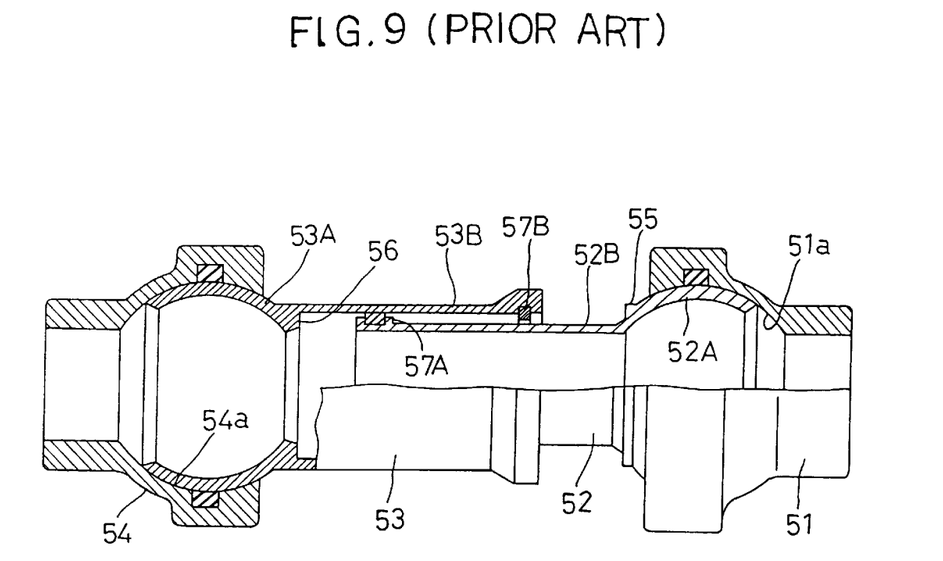
FIG. 9 is a vertical section showing an entire telescopic pivotal pipe joint relating to the prior art.

The conventional telescopic pivotal pipe joint is shown in FIG. 9. As shown, in this joint, a second pipe member 52 includes a semi-spherical pipe portion 52A extending with an inclination about a semi-spherical inner peripheral face of a first pipe member 51 in an invariable thickness and a straight pipe portion 52B formed integrally with one axial end of the semi-spherical pipe portion 52A. Further, on an outer peripheral face of the second pipe member 52 and at a position corresponding to the border between the semi-spherical pipe portion 52A and the straight pipe portion 52B, there is formed a first annular stopper portion 55, to which one end of a third pipe member 53 comes into contact when the second pipe member 52 and a third pipe member 53 are telescopically contracted maximally relative to each other.

On the other end of an outer peripheral face of a straight pipe portion 53B of the third pipe member 53, there is formed a semi-spherical pipe portion 53A projecting outwards in the radial direction, which is pivotally engaged and supported to a semi-spherical inner peripheral face 54a of a fourth pipe member 54. And, on the inner peripheral face of the third pipe member 53 and at a position corresponding to the border between the straight pipe portion 53B to be engaged on the straight pipe portion 52B of the second pipe member 52 and the semi-spherical pipe portion 53A, there is formed a second stopper portion 56 projecting inwards in the radial direction, to which one end of the straight pipe portion 52B of the second pipe member 52 comes into contact along the axial direction of the pipe when second pipe member 52 and the third pipe member 53 are telescopically contracted maximally relative to each other. Moreover, at one end of the straight pipe portion 52B of the second pipe member 52 and at one end of the straight pipe portion 53B of the third pipe member 53 respectively, there are formed third stopper portions 57A, 57B which come into abutment against each other along the axial direction when the second pipe member 52 and the third pipe member 53 are telescopically extended maximally relative to each other (see e.g. Japanese laid-open utility model gazette Hei. 4-66486 and Japanese laid-open utility model gazette Hei. 5-66394).

With the conventional telescopic pivotal pipe joint having the above-described construction, the maximally contracted condition of the joint is realized when the one end of the straight pipe portion 53B of the third pipe member 53 comes into abutment against the first stopper portion 55 of the second pipe member 52 and also the one end of the straight pipe portion 52B of the second pipe member 52 comes into abutment against the second stopper portion 56 of the third pipe member 53. Conversely, the maximally extended condition of the joint is realized when the third stopper portion 57A of the second pipe member 52 and the third stopper portion 57B of the third pipe member 53 come into abutment against each other. And, the respective stopper portions 55, 56, 57A, 57B are formed at the axial opposed ends of the straight pipe portion 52B of the second pipe member 52 and at the axial opposed ends of the straight pipe portion 53B of the third pipe member 53, respectively. For this reason, in order to reserve a large amount of extension/contraction between the second pipe member 52 and the third pipe member 53, it is necessary to extend the axial lengths of the respective pipe portions 52B, 53B. This invited increase in the physical size, weigh and manufacture cost of the entire pipe joint.

The present invention attends to the above-noted drawback of the prior art and a primary object of this invention is to provide an improved telescopic pivotal pipe joint which allows reservation of a greater amount of extension/contraction between the pipe members thereof when subjected to an external force without necessitating such increase of axial lengths of the pipe members.

SUMMARY OF THE INVENTION

For accomplishing the above object, a telescopic pivotal pipe joint, according to the present invention, comprises:

a first pipe member including a semi-spherical inner peripheral face;

a second pipe member including a semi-spherical pipe portion projecting radially outward and sidable along the semi-spherical inner peripheral face of the first pipe member, the second pipe member being slidably engaged within the first pipe member;

a third pipe member telescopically slidable in an axial direction and engaged on a straight pipe portion co-extensive with the semi-spherical pipe portion of the second pipe member;

wherein the semi-spherical pipe portion of the second pipe member defines an annular groove, into which one end of the third pipe member comes into engagement along the axial direction when the second pipe member and the third pipe member are contracted maximally relative to each other.

According to the above-described construction, the maximal extension/contraction amount between the second pipe member and the third pipe member corresponds to the sum of the extension/contraction amount of the straight pipe portion of the second pipe member and the extension/contraction amount at the annular groove defined in the semi-spherical pipe portion of the second pipe member. In other words, the extension/contraction between the second and third pipe members is effected by utilizing also the inner portion of the semi-spherical pipe portion of the second pipe member. Thus, for obtaining a same extension/contraction amount, the axial lengths of the respective straight pipe portions of the second and third pipe members may be reduced, by the amount corresponding to the amount of engagement of the one end of the third pipe portion into the annular groove of the semi-spherical pipe portion of the second pipe member.

Hence, in comparison with the conventional telescopic pivotal pipe joint, with the pipe joint according to the present invention, it has become possible to reserve a larger amount of extension/contraction available at the time of exposure to external force, without inviting disadvantageous increase in the physical size, weight and manufacture cost of the entire pipe joint.

Preferably, in the above-described construction, the semi-spherical pipe portion of the second pipe member is formed integrally with a straight pipe portion of the second pipe member on the end opposite to the opening of the annular groove; and the annular groove is formed between an inner peripheral face of the semi-spherical pipe portion and an outer peripheral face of the straight pipe portion opposing thereto of the second pipe member.

With the above construction, it is possible for the annular groove to have a long length in the direction of pipe axis, so that the maximal extension/contraction amount between the second pipe member and the third pipe member may be increased. Moreover, with the provision of the annular space formed between the opposing faces, i.e. the inner peripheral face of the semi-spherical pipe portion and the outer peripheral face of the straight pipe portion, the weight and manufacture costs of the entire pipe joint may be further reduced.

Preferably, a sixth pipe member slidable along the pipe axis is telescopically slidably engaged into the other end of the third pipe member; the sixth pipe member includes, at the other end thereof, a semi-spherical pipe portion projecting radially outward and pivotably engaged and supported to a semi-spherical inner face of a fourth pipe member; and the semi-spherical pipe portion of the sixth pipe member defines an annular groove, into which the other end of the third pipe member comes into engagement along the axial direction when the second pipe member and the sixth pipe member are contracted maximally relative to each other.

According to the above construction, the relative pivotal movement along the semi-spherical portions between the first pipe member and the second pipe member and also the relative pivotal movement on the semi-spherical portions between the fourth pipe member and the sixth pipe member may effectively absorb such external forces as the shearing force or bending moment effective in a direction transverse to the direction of pipe axis. Moreover, when the second pipe member and the third pipe member as well as the third pipe member and the sixth pipe member respectively are maximally contracted relative to each other, the opposed ends of the third pipe member respectively come into the annular groove formed at the semi-spherical portion of the second pipe member and the further annular groove formed at the semi-spherical portion of the sixth pipe member. Therefore, by the sum of the amounts of the engagement of the opposed ends, the axial lengths respectively of the straight pipe portions of the second, third and sixth pipe members may be reduced advantageously.

Accordingly, the amount of the extension/contraction to cope with the external forces may be further increased while further reducing the physical size, weight and manufacture cost of the entire telescopic pipe joint.

Preferably, the semi-spherical pipe portion of the second pipe member includes, within the annular groove thereof, a plurality of reinforcing ribs peripherally spaced apart from each other; and an end of each reinforcing rib functions as a stopper for coming into abutment against the other end of the third pipe member introduced into the annular groove along the pipe axial direction.

With the above-described construction, the semi-spherical pipe portion of the second pipe member includes the annular groove into which the one end of the third pipe member enters when the second pipe member and the third pipe member are maximally extended/contracted relative to each other, thus reserving a large amount of extension/contraction available for coping with external forces while reducing the size, weight and manufacture cost of the entire pipe joint. In addition, with provision of the plurality of reinforcing ribs within the annular groove, sufficient strength of the entire pipe joint may be maintained.

Moreover, the reinforcing ribs function also as stopper portions which come into abutment along the pipe axial direction against the one end of the third pipe member introduced into the annular groove. Then, there is no necessity of providing any stopper portions separately, so that the construction may be simple.

Preferably, the semi-spherical pipe portion of the sixth pipe member includes, within the annular groove thereof, a plurality of reinforcing ribs peripherally spaced apart from each other; and an end of each reinforcing rib functions as a stopper for coming into abutment against the other end of the third pipe member introduced into the annular groove along the pipe axial direction.

With the above-described construction, the semi-spherical pipe portion of the sixth pipe member includes the annular groove into which the one end of the third pipe member enters when the third pipe member and the sixth pipe member are maximally extended/contracted relative to each other, thus reserving a large amount of extension/contraction available for coping with external forces while reducing the size, weight and manufacture cost of the entire pipe joint. In addition, with provision of the plurality of reinforcing ribs within the annular groove, sufficient strength of the entire pipe joint may be maintained.

Moreover, the reinforcing ribs function also as stopper portions which come into abutment along the pipe axial direction against the one end of the third pipe member introduced into the annular groove. Then, there is no necessity of providing any stopper portions separately, so that the construction may be simple.

Preferably, the second pipe member includes, at the end thereof adjacent the semi-spherical pipe portion, an inner peripheral face portion which is formed as a tapered face having a progressively increasing diameter toward said end.

With the above-described construction, when the first pipe member and the second pipe member are pivoted to each other along the semi-spherical face, the one end of the second pipe member will project by a smaller amount toward the center of the passage (passage axis or pipe axis) on the upstream side in the pivotal direction. As a result, the tapered arrangement can restrict reduction in the cross-section area of the passage due to the pivotal flexion between the first and second pipe members.

Preferably, the sixth pipe member includes, at the end thereof adjacent the semi-spherical pipe portion, an inner peripheral face portion which is formed as a tapered face having a progressively increasing diameter toward said end.

With the above-described construction, when the fourth pipe member and the sixth pipe member are pivoted to each other along the semi-spherical face, the one end of the sixth pipe member will project by a smaller amount toward the center of the passage (passage axis or pipe axis) on the upstream side in the pivotal direction. As a result, the tapered arrangement can restrict reduction in the cross-section area of the passage due to the pivotal flexion between the fourth and sixth pipe members.

According to a further construction of the telescopic pivotal pipe joint relating to the present invention, one end of the second pipe member extends into an area where the semi-spherical pipe portion of the third pipe member is formed.

With this construction, the maximal extension/contraction amount between the second pipe member and the third pipe member corresponds to the sum of the extension/contraction amount of the straight pipe portion of the third pipe member and the extension amount into the area where the semi-spherical pipe portion inside the third pipe member. In other words, the extension/contraction between the second and third pipe members is effected by utilizing also the extension amount into the area where the semi-spherical pipe portion inside the third pipe portion. Thus, for obtaining a same extension/contraction amount, the axial lengths of the respective straight pipe portions of the second and third pipe members may be reduced, by the amount corresponding to the amount of the extension of the one end of the second pipe member into the area where the semi-spherical pipe portion inside the third pipe member.

Hence, in comparison with the conventional telescopic pivotal pipe joint, with the pipe joint according to the present invention, it has become possible to reserve a larger amount of extension/contraction available at the time of exposure to external force, without inviting disadvantageous increase in the physical size, weight and manufacture cost of the entire pipe joint.

Preferably, at the area where the semi-spherical pipe portion of the third pipe member is formed, the third pipe member includes an inner pipe portion for guiding sliding movement of the one end of the second pipe member along the pipe axis, the inner pipe portion extending integrally from and having a same diameter as the straight pipe portion of the third pipe member.

With the above construction, the telescopic extending/contracting movement between the second pipe member and the third pipe member may be guided in a reliable and smooth manner over the entire range of the movement. Moreover, in comparison e.g. with a construction the sperical inner peripheral face of the semi-spherical pipe portion of the third pipe member is exposed inside the straight pipe passage, the above construction can restrict pressure loss due to turbulent fluid flow.

Preferably, according to a still further construction of a telescopic pivotal pipe joint relating to the invention, in the third pipe member, there is formed a closed annular space between the inner peripheral face of the semi-spherical pipe portion and an outer peripheral face opposing thereto of the inner pipe portion.

With the above construction, by providing the annular closed space between the inner peripheral face of the semi-spherical pipe portion and an outer peripheral face opposing thereto of the inner pipe portion, the weight of the pipe joint may be further reduced.

Further and other features and advantages of the invention will become more apparent from the following detailed description of the invention with reference to the accompanying drawings.

DESCRIPTION OF THE PREFERRED EMBODIMENTS

Preferred embodiments of a telescopic pivotal pipe joint relating to the invention will now be described in details with reference to the accompanying drawings.

Figure 1:
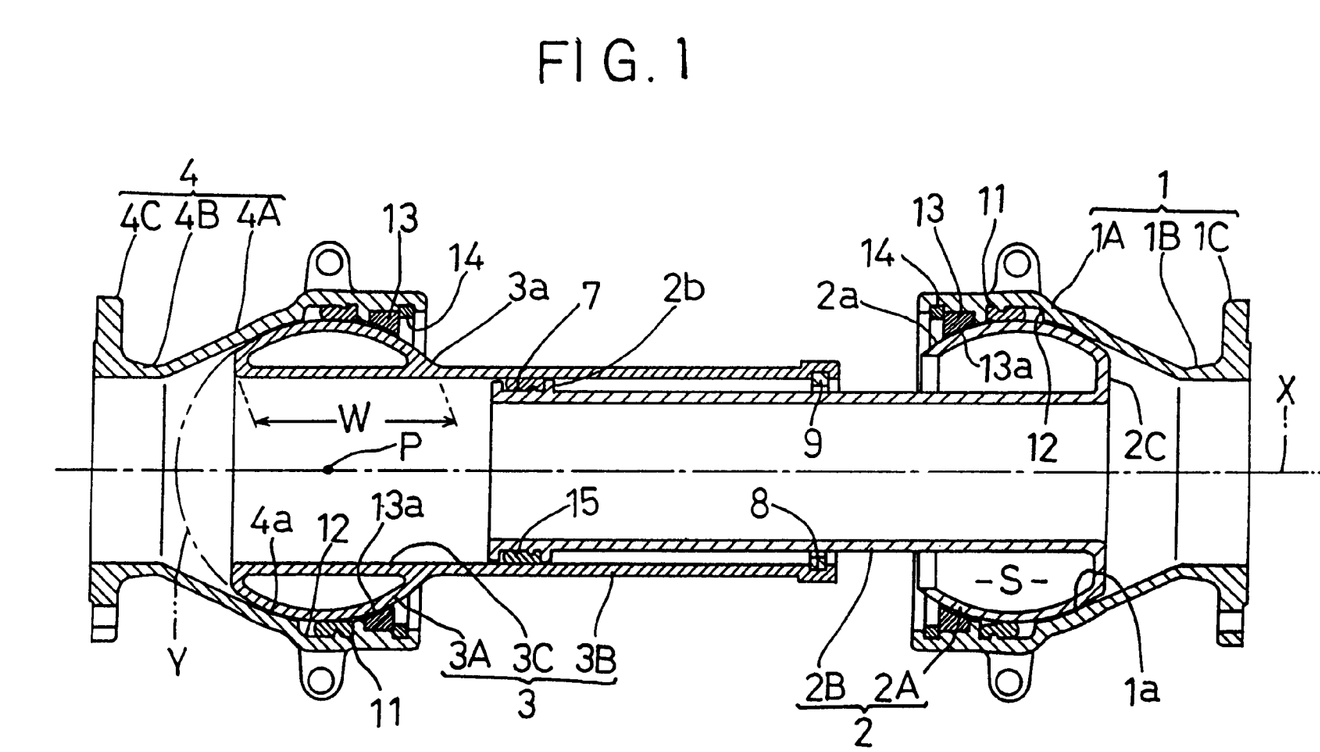
FIG. 1 is a vertical section showing an entire telescopic pivotal pipe joint relating to a first preferred embodiment of the present invention.
Figure 2:
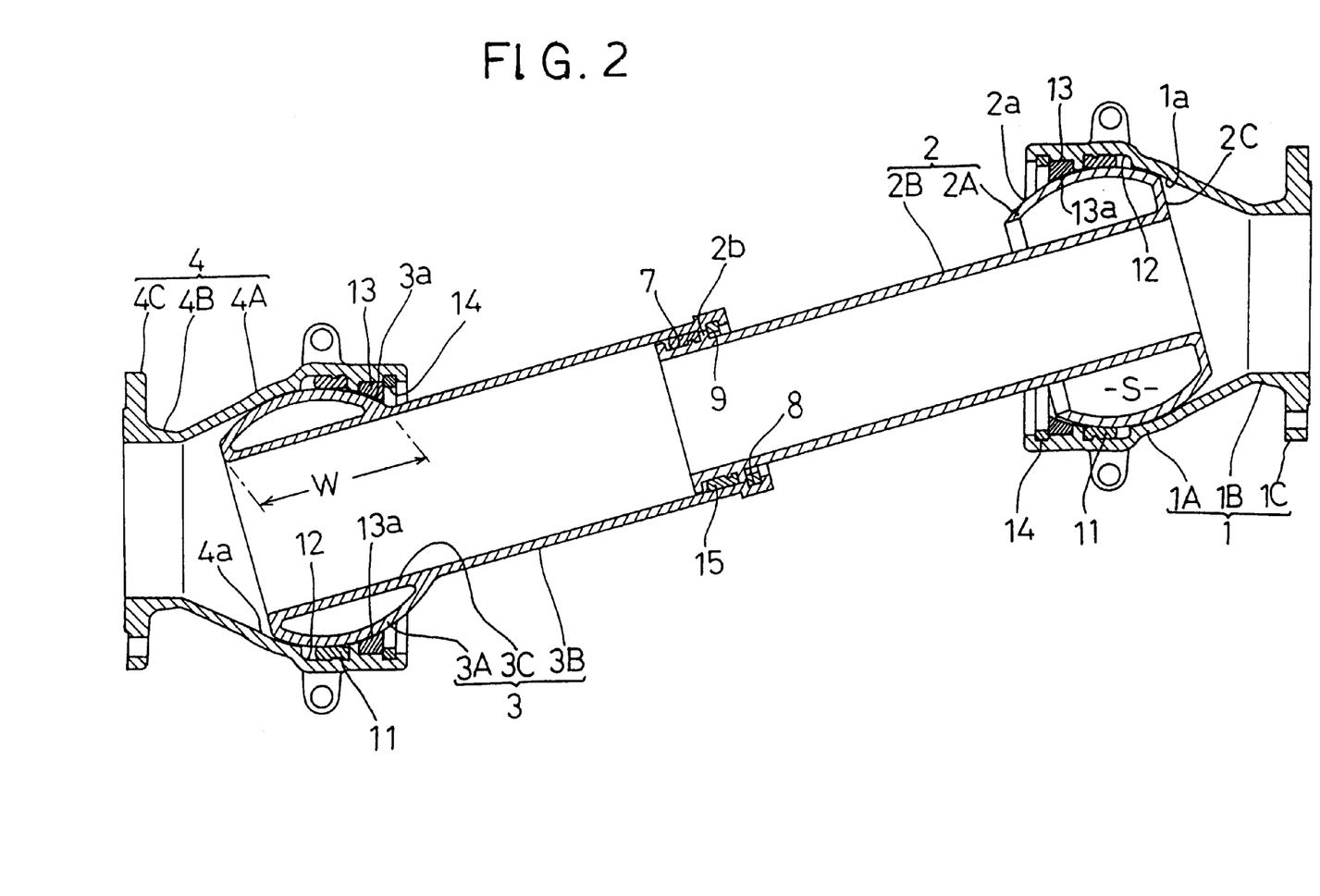
FIG. 2 is a vertical section showing the entire pipe joint when the joint is telescopically extended and pivoted due to application of an external force thereto.
Figure 3:
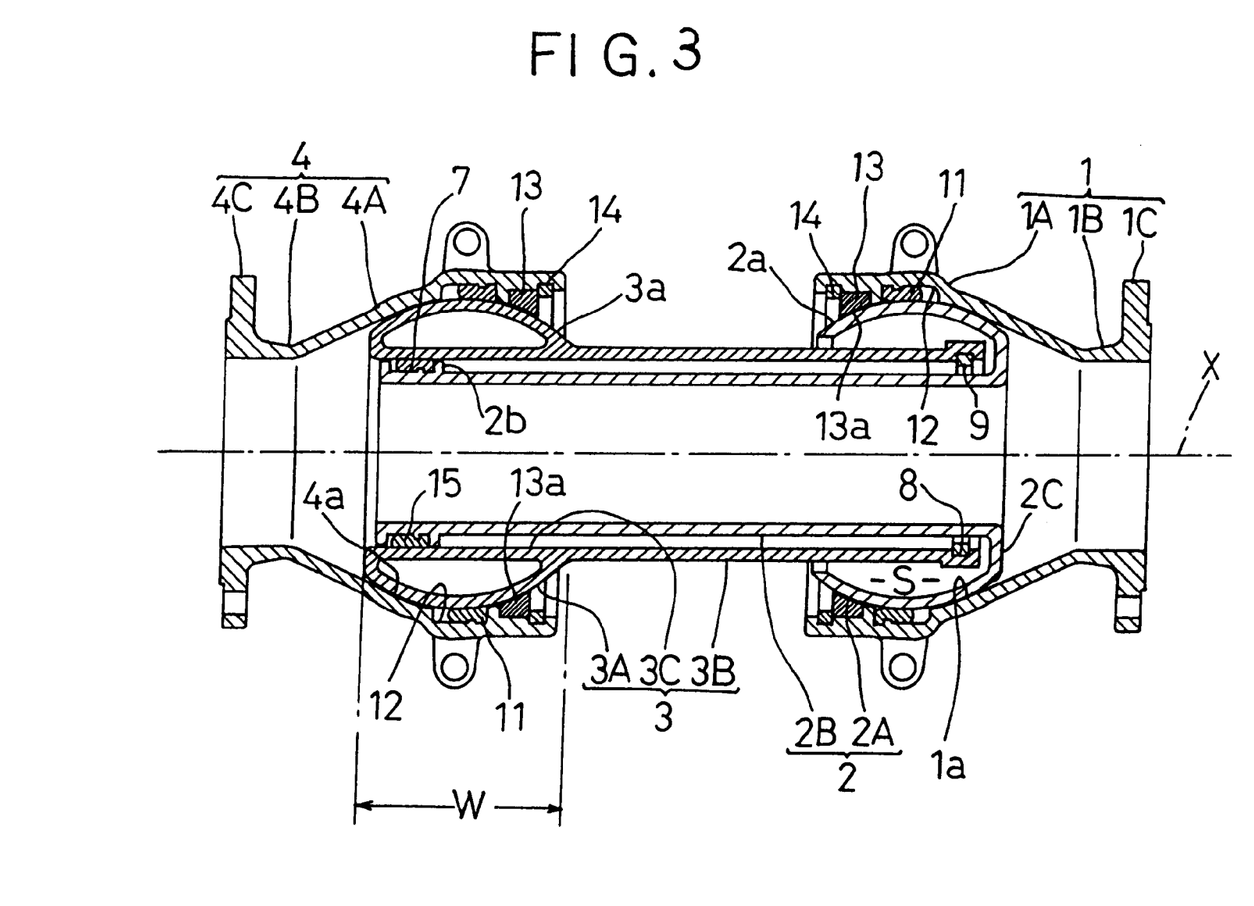
FIG. 3 is a vertical section showing the entire pipe joint when the joint is telescopically contracted due to application of an external force thereto.

A telescopic pivotal pipe joint shown in FIGS. 1 through 3 for use in fluid transportation includes a first joint pipe 1 made of cast iron as a first pipe member, or outer pipe member, having a semi-spherical inner peripheral face 1$a$ and a second joint pipe 2 made of cast iron as a second pipe member having, or inner pipe member, a semi-spherical pipe portion 2A projecting radially outward and sidable along the semi-spherical inner peripheral face 1$a$, with the second joint pipe 2 being slidably engaged into the first joint pipe 1. On a straight pipe portion 2B of the second joint pipe 2 co-extensive with the semi-spherical pipe portion 2A, there is fitted a straight pipe portion 3B of a third joint pipe 3 as a third pipe member, or inner pipe member, telescopically slidable along a pipe axis X.

Further, on the other end of the outer peripheral face of the straight pipe portion 3B of the third joint pipe 3, there is formed a semi-spherical pipe portion 3A projecting radially outward, on which a semi-spherical inner peripheral face 4$a$ of a fourth joint pipe 4 made of cast iron as a fourth pipe member, or outer pipe member. And, between the inner peripheral face of this semi-spherical pipe portion 3A and the outer peripheral face opposing thereto of the inner pipe portion 3C of the third joint pipe 3, there is formed an annular closed space. In the semi-spherical pipe portion 2A of the second pipe member 2, there is formed an annular groove S, into which one end of the third joint pipe 3 enters along the pipe axis X when the second joint pipe 2 and the third joint pipe 3 are telescopically contracted maximally relative to each other.

At an end portion of the outer peripheral face of the straight pipe portion 2B of the second pipe member 2, there is formed an annular seal retaining groove 7 for engaging and retaining therein a first elastic seal member 15 made of synthetic rubber (e.g. styrene butadiene rubber) for sealing between the inner peripheral face of the third joint pipe and the outer peripheral face of the straight pipe portion 2B of the second joint pipe 2. And, at an end of the inner peripheral face of the straight pipe portion 3B of the third joint pipe 3, there is defined an annular attachment groove 8 opened inward in the direction of pipe radius. In this attachment groove 8, there is fitted a stopper member 9 made of stainless steel capable of radially extending deformation, against which one annular rib 2$b$ constituting the seal retaining groove 7 comes into abutment along the direction of pipe axis X when the second joint pipe 2 and the third joint pipe 3 are telescopically extended maximally relative to each other along the direction of pipe axis X.

The other end of the semi-spherical pipe portion 2A of the second joint pipe 2 away from the end where the annular groove S is opened is formed integrally with an end of the straight pipe portion 2B via a bridging wall portion 2C extending along the radial direction of the pipe. And, between the semi-spherical inner peripheral face of the semi-spherical pipe portion 2A and the outer peripheral face opposing thereto of the straight pipe portion 2, the annular groove S is formed.

Further, the bridging wall portion 2C of the second joint pipe 2 is constructed so as to function also as a stopper portion, against which one end of the straight pipe portion 3B of the third joint pipe 3 comes into abutment along the direction of pipe axis X. At a portion of the third joint pipe 3 corresponding to an area W where the semi-spherical pipe portion 3A is formed, there is formed an inner pipe portion 3C for slidably guiding the extending/contracting movement of the one end of the straight pipe portion 2B of the second joint pipe 2 along the direction of the pipe axis X, with the inner pipe portion 3C having a same diameter as the straight pipe portion 3B of the third joint pipe 3 and being formed integrally therewith.

Then, when the second joint pipe 2 and the third joint pipe 3 are maximally contracted relative to each other, the end of the straight pipe portion 2B of the second joint pipe 2 extends into the portion corresponding to the area W where the semi-spherical pipe portion 3A is formed inside the third joint pipe, more particularly at a portion corresponding to the leading end of the semi-spherical pipe portion 3A. Also, the one end of the straight pipe portion 3B of the third joint pipe 3 enters into a deep inner portion of the annular groove S formed in the semi-spherical pipe portion 2A of the second joint pipe 2, that is, until the end of the straight pipe portion 3B of the third join pipe 3 extends to come into abutment against the bridging wall portion 2C of the second joint pipe 2.

Therefore, by an amount corresponding to the sum of the amount of the extension of the one end of the straight pipe portion 2B of the second joint pipe 2 into the area W where the semi-spherical pipe portion 3A inside the third joint pipe 3 and the amount of the extension of the one end of the straight pipe portion 3 of the third joint pipe 3 into the annular groove S defined in the semi-spherical pipe portion 2A of the second joint pipe 2, the lengths of the straight pipe portion 2B of the second joint pipe 2 and of the straight pipe portion 3B of the third joint pipe 3 along the direction of the pipe axis X may be reduced. As a result, it becomes possible to reserve a large extension/contraction amount available to cope with an external force such as an axial compression or tensile stress due to an earthquake or differential settlement of the earth.

In the inner peripheral face of the spherical pipe portion 1A of the first joint pipe 1 and at a portion thereof extending continuously from the semi-spherical inner peripheral face 1a, there is defined an annular seal retaining groove 12 for retaining therein a second elastic seal member 11 made of synthetic rubber (e.g. styrene butadiene rubber) for sealing relative to the outer peripheral face 2a of the semi-spherical pipe portion 2A of the second joint pipe 2. Further, at the end of the straight pipe portion 1B of the first joint pipe 1, there is integrally formed a connecting flange 1C for fixedly connecting thereto a fluid pipe device such as a fluid transport pipe (e.g. water pipe), a partitioning valve or the like by means of bolts and nuts.

Further, in the inner peripheral face adjacent the opening of the semi-spherical pipe portion 1A of the first joint pipe 1, there are provided a slide guiding member 13 made of cast iron and having a semi-spherical sliding face 13a placed in sliding contact with the outer peripheral face 2a of the semi-spherical pipe portion 2A of the second joint pipe 2 and a C-shaped stopper member 14 made of stainless steel capable of radially extending deformation.

The fourth joint pipe 4 has a substantially identical construction to that of the first joint pipe 1. Namely, in the inner peripheral face of the spherical pipe portion 4A of the fourth joint pipe 4 and at a portion thereof extending continuously from the semi-spherical inner peripheral face 4a, there is defined an annular seal retaining groove 12 for retaining therein a second elastic seal member 11 made of synthetic rubber (e.g. styrene butadiene rubber) for sealing relative to the outer peripheral face 3a of the semi-spherical pipe portion 3A of the third joint pipe 3. Further, at the end of the straight pipe portion 4B of the fourth joint pipe 4, there is integrally formed a connecting flange 4C for fixedly connecting thereto a fluid pipe device such as a fluid transport pipe (e.g. water pipe), a partitioning valve or the like by means of bolts and nuts.

Further, in the inner peripheral face adjacent the opening of the semi-spherical pipe portion 4A of the fourth joint pipe 4, there are provided a slide guiding member 13 made of cast iron and having a semi-spherical sliding face 13a placed in sliding contact with the outer peripheral face 3a of the semi-spherical pipe portion 3A of the third joint pipe 3 and a C-shaped stopper member 14 made of stainless steel capable of radially extending deformation.

Incidentally, when the second joint pipe 2 and the third joint pipe 3 are maximally contracted relative to each other, one end of the straight pipe portion 2B of the second joint pipe 2 extends into the portion corresponding to the area W inside the third joint pipe 3 where the semi-spherical pipe portion 3A is formed. In this, the maximal extending position of the one end of the straight pipe portion 2B is set either on a virtual spherical face Y extending about a center of sphere extending through the outer peripheral face 3a of the semi-spherical pipe portion 3A of the third joint pipe 3 or on the inner side than this virtual spherical face (on the side of the semi-spherical pipe portion 2A of the second joint pipe 2).

With the above-described setting, when the third joint pipe 3 and the fourth joint pipe 4 are pivoted relative to each other along the semi-spherical face when the second joint pipe 2 and the third joint pipe 3 are maximally contracted to each other, the one end of the second joint pipe 2 will not be hooked or engaged with the inner peripheral face of the fourth joint pipe 4, so that the third joint pipe 3 and the fourth joint pipe 4 may be pivoted in a reliable and smooth manner over the entire predetermined pivotal range thereof.

[second embodiment]

Figure 4:
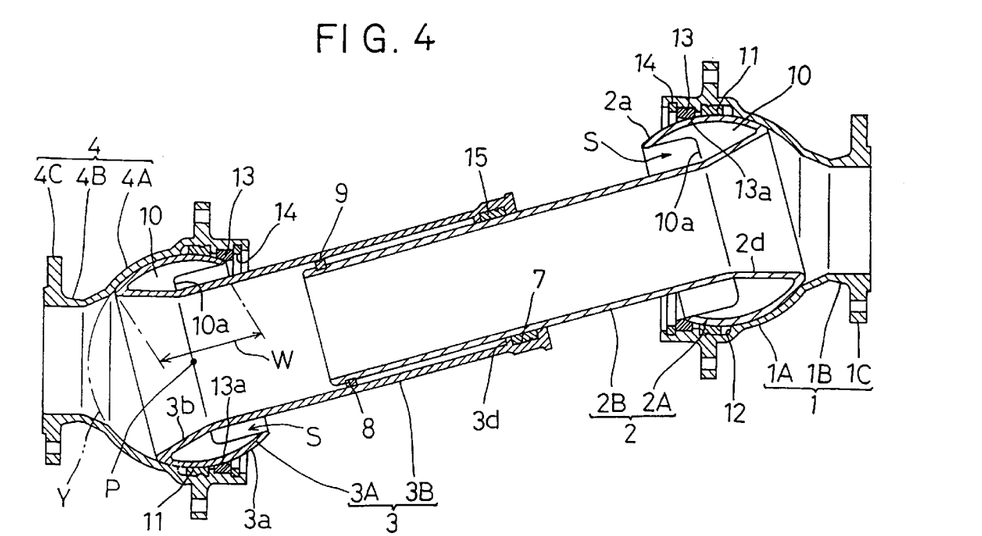
FIG. 4 is a vertical section showing an entire telescopic pivotal pipe joint relating to a second preferred embodiment of the present invention.
Figure 5:
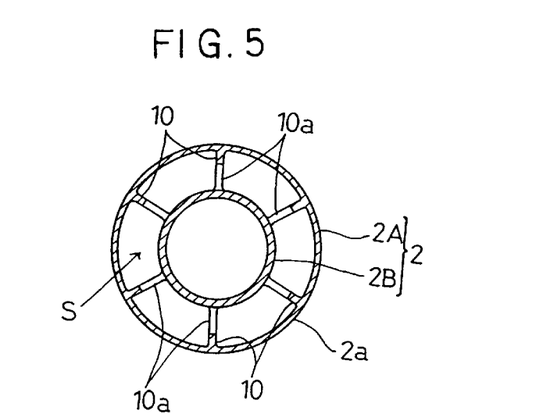
FIG. 5 is an enlarged section showing principal portions of a second pipe member.

FIGS. 4 and 5 show improvement of the telescopic pivotal pipe joint described in the first embodiment above. In this embodiment, the semi-spherical pipe portion 2A of the second joint pipe 2 integrally includes, inside the annular groove S, a plurality (total six in the instant embodiment) of reinforcing ribs 10 spaced apart from each other along the peripheral direction. Further, one end (one end face) 10a of each of these reinforcing ribs 10 facing the opening of the annular groove S is constructed so as to act also as a stopper portion, which comes, along the direction of pipe axis X, into abutment against the one end of the straight pipe portion 3B of the third joint pipe 3 introduced into the annular groove S.

Therefore, like the first embodiment described hereinbefore, the semi-spherical pipe portion 2A of the second joint pipe 2 defines an annular groove S, into which the one end of the third joint pipe 3 extends along the direction of the pipe axis X when the second joint pipe 2 and the third joint pipe 3 are maximally contracted to each other. As the result, while reducing the size, weight and manufacture cost of the entire pipe joint, it is possible to reserve a large extension/contraction amount. Also, with the provision of the plurality of reinforcing ribs 10 inside the annular groove S, it is possible to provide sufficient strength to the entire pipe joint.

Moreover, as a portion of each reinforcing rib 10 is used also as a stopper portion, which comes, along the direction of pipe axis X, into abutment against the one end of the straight pipe portion 3B of the third joint pipe 3 introduced into the annular groove S, there is no necessity of providing any stopper portions separately. Hence, the construction of the pipe joint may be simple.

The semi-spherical pipe portion 3A of the third joint pipe 3 too is provided with an annular groove S opened along the direction of the pipe axis X toward the semi-spherical pipe portion 2A of the second joint pipe 2; and this semi-spherical pipe portion 3A integrally includes, inside the annular groove S, a plurality (total six in the instant embodiment) of reinforcing ribs 10 spaced apart from each other in the peripheral direction.

The annular groove S defined in the semi-spherical pipe portion 3A of the third joint pipe 3 is constructed so as to act also as a gas bleeder hole for use in casting the third joint pipe 3.

In the inner peripheral face of the second pipe member 2, an inner peripheral face portion 2d thereof at the other end adjacent the semi-spherical pipe portion 2A, that is, the inner peripheral face portion 2d extending from the end of the straight pipe portion 2B to the one end 10a of the reinforcing ribs 10, is formed as a tapered face having a progressively increasing diameter toward said other end. Also, in the inner peripheral face of the straight pipe portion 3B of the third joint pipe 3, an inner peripheral face portion 3b thereof at the other end adjacent the semi-spherical pipe portion 3A, that is, the inner peripheral face portion 3b extending from the end of the straight pipe portion 3B to the one end (one end face) 10a of the reinforcing ribs 10 along the radial direction, is formed as a tapered face having a progressively increasing diameter toward said other end.

With the above-described construction, when the first joint pipe 1 and the second joint pipe 2 are pivoted to each other along the semi-spherical face, the one end of the second joint pipe 2 will project by a smaller amount toward the center of the passage (passage axis or pipe axis X) on the upstream side in the pivotal direction. As a result, the tapered arrangement can restrict reduction in the cross-section area of the passage due to the pivotal flexion between the first and second joint pipes 1 and 2.

Also, when the third joint pipe 3 and the fourth joint pipe 4 are pivoted to each other along the semi-spherical face, the one end of the third joint pipe 3 will project by a smaller amount toward the center of the passage (passage axis or pipe axis X) on the upstream side in the pivotal direction. As a result, the tapered arrangement can restrict reduction in the cross-section area of the passage due to the pivotal flexion between the third and fourth joint pipes 3 and 4, as well.

At an end portion of the inner peripheral face of the straight pipe portion 3B of the third pipe member 3, there is formed an annular seal retaining groove 7 for engaging and retaining therein a first elastic seal member 15 made of synthetic rubber (e.g. styrene butadiene rubber) for sealing between the inner peripheral face of the third joint pipe 3B and the outer peripheral face of the straight pipe portion 2B of the second joint pipe 2. And, at an end of the outer peripheral face of the straight pipe portion 2B of the second joint pipe 2, there is defined an annular attachment groove 8 opened inward in the direction of pipe radius. In this attachment groove 8, there is fitted a stopper member 9 made of stainless steel capable of radially extending deformation, against which one annular rib 3d constituting the seal retaining groove 7 comes into abutment along the direction of pipe axis X when the second joint pipe 2 and the third joint pipe 3 are telescopically extended maximally relative to each other along the direction of pipe axis X.

The remaining constructions are same as the first embodiment, and therefore the like members are denoted with like reference marks as the first embodiment and will not be described any further.

[third embodiment]

Figure 6:
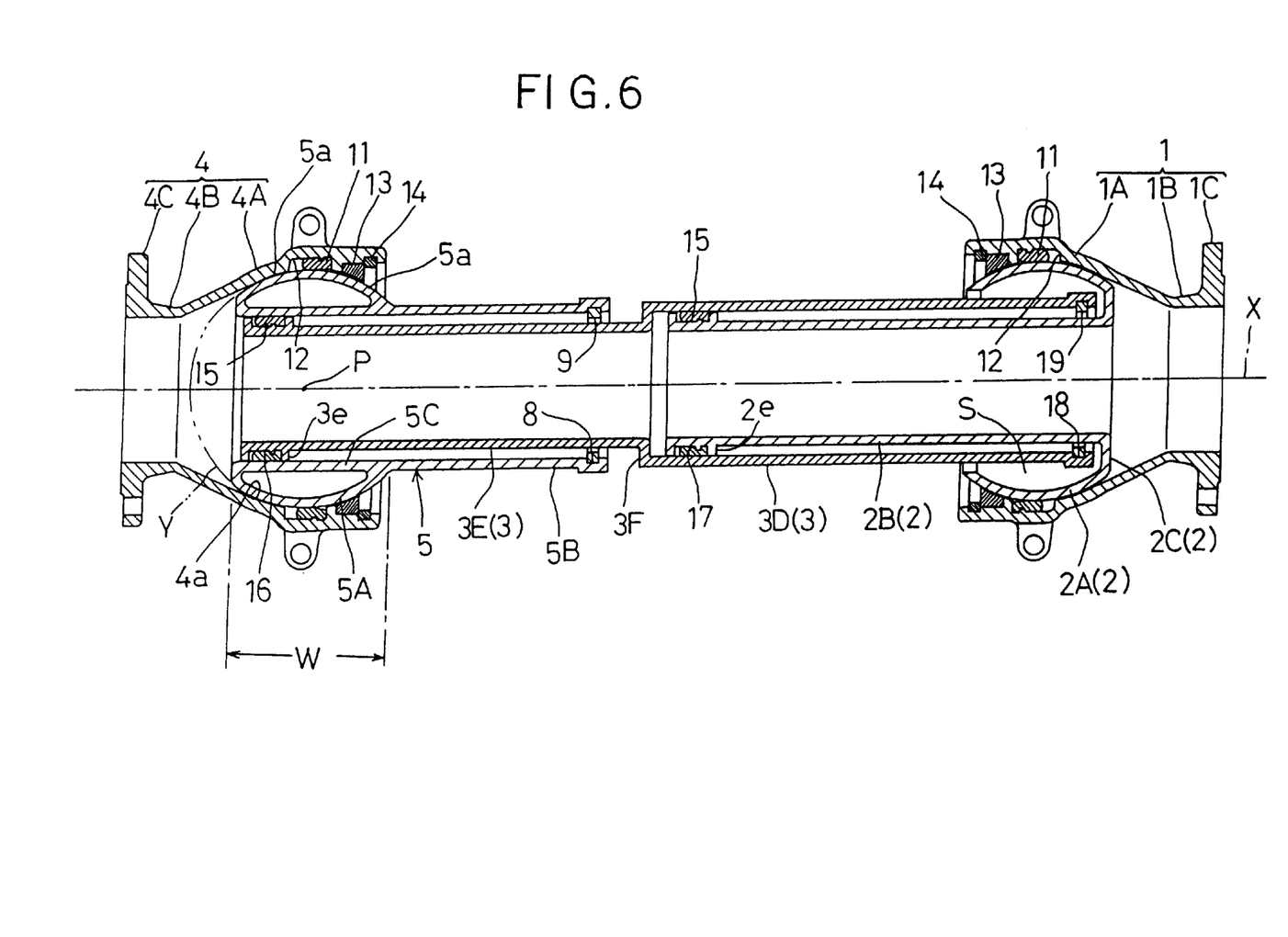
FIG. 6 is a vertical section showing an entire telescopic pivotal pipe joint relating to a third preferred embodiment of the present invention.

A telescopic pivotal pipe joint shown in FIG. 6 for use in fluid (e.g. water) transportation includes a first joint pipe 1 made of cast iron as a first pipe member, or outer pipe member, having a semi-spherical inner peripheral face 1a and a second joint pipe 2 made of cast iron as a second pipe member, or inner pipe member, having a semi-spherical pipe portion 2A projecting radially outward and sidable along the semi-spherical inner peripheral face 1a, with the second joint pipe 2 being slidably engaged into the first joint pipe 1. On a straight pipe portion 2B of the second joint pipe 2 co-extensive with the semi-spherical pipe portion 2A, there is fitted a large-diameter straight pipe portion 3D, or first straight pipe portion, of a third joint pipe 3 as a third pipe member, or connecting pipe member, telescopically sidable along a pipe axis X.

Further, on an outer peripheral face of a small-diameter portion 3E, or second straight pipe portion, of the third joint pipe 3, there is fitted a straight pipe portion 5B of a fifth joint pipe 5 made of cast iron as a fifth pipe member, or inner pipe member, slidably extending and contracting along the direction of the pipe axis X. On the other end of the straight pipe portion 5B of this fifth joint pipe 5, there is formed a semi-spherical pipe portion 5A projecting radially outward and pivotally fitted to a semi-spherical inner peripheral face 4a of a fourth joint pipe 4 made of cast iron as a fourth pipe member, or outer pipe member. The semi-spherical pipe portion 2A of the second joint pipe 2 defines an annular groove S, in to which one end of the large-diameter portion 3D of the third joint pipe 3 extends along the direction of the pipe axis X when the second joint pipe 2 and the third joint pipe 3 are maximally contracted to each other.

The third joint pipe 3 includes the large-diameter straight pipe portion 3D extensively and contractibly fitted on the straight pipe portion 2B of the second joint pipe 2 and the small-diameter straight pipe portion 3E extensively and contractibly fitted in the straight pipe portion 5B of the fifth joint pipe 5. Further, adjacent the leading end in the outer peripheral face of the small-diameter straight pipe portion 3E, there is defined an annular seal retaining groove 16 for retaining therein a first elastic seal member 15 made of synthetic rubber (e.g. styrene butadiene rubber) for sealing between the outer peripheral face of the small-diameter straight pipe portion 3E and the inner peripheral face of the straight pipe portion 5B of the fifth joint pipe 5.

Also, adjacent one end of the outer peripheral face of the second joint pipe 2, there is defined an annular seal retaining groove 17 for retaining therein a first elastic seal member 15 made of synthetic rubber (e.g. styrene butadiene rubber) for sealing between the outer peripheral face of the straight pipe portion 2E and the inner peripheral face of the large-diameter straight pipe portion 3B of the third joint pipe 3.

And, at an end of the inner peripheral face of the straight pipe portion 5B of the fifth joint pipe 5, there is defined an annular attachment groove 8 opened inward in the direction of pipe radius. In this attachment groove 8, there is fitted a stopper member 9 made of stainless steel capable of radially extending deformation, against which one annular rib 3e constituting the seal retaining groove 16 comes into abutment along the direction of pipe axis X when the second joint pipe 2 and the third joint pipe 3 are telescopically extended maximally relative to each other along the direction of pipe axis X.

Also, at one end of the inner peripheral face of the large-diameter straight pipe portion 3D of the third joint pipe 3, there is formed an annular groove 18 opened radially inward, in which there is fitted a radially deformable stopper member 19 made of stainless steel which comes into abutment against one inner peripheral face portion 2e constituting the seal retaining groove 17 when the second joint pipe 2 and the third joint pipe 3 are maximally extended along the pipe axis X.

The fifth joint pipe 5 includes, at a portion thereof corresponding to an area W where the semi-spherical pipe portion 5A is formed, an inner pipe portion 5C for slidably guiding the extending/contracting movement of the end portion (on the side of the fourth joint pipe) on the other end of the small-diameter straight pipe portion 3E of the third joint pipe 3, the inner pipe portion 5C having a same diameter as and extending continuously from the straight pipe portion 5B of the fifth joint pipe 5. And, a bridging wall portion 2C formed integrally with and extending between the other end portion of the straight pipe portion 2B and the corresponding end portion of the semi-spherical pipe portion 2A, the second joint pipe 2 and the third joint pipe 3 is constructed so as to act also a stopper portion, against which the one end of the large-diameter straight pipe portion 3D of the third joint pipe 3 comes into abutment along the direction of the pipe axis X when the second joint pipe 2 and the third joint pipe 3 are maximally contracted to each other along the direction of the pipe axis X. Further, a stepped portion 3F of the third joint pipe 3 formed at a position corresponding to a border between the small-diameter straight pipe portion 2E and the large-diameter straight pipe portion 3D is constructed so as to act also as a stopper portion, against which the one end of the straight pipe portion 5B of the fifth joint pipe 5 comes into abutment when the fifth joint pipe 5 and the third joint pipe 3 are maximally contracted relative to each other along the direction of the pipe axis X.

Then, when the fifth joint pipe 5 and the third joint pipe 3 are maximally contracted relative to each other, the end portion (on the side of the fourth joint pipe) at the other end of the small-diameter straight pipe portion 3E of the third joint pipe 3 extends into the portion corresponding to the area W where the semi-spherical pipe portion 5A is formed inside the fifth joint pipe 5, more particularly at a portion corresponding to the leading end of the semi-spherical pipe portion 5A. Also, the one end of the large-diameter straight pipe portion 3D of the third joint pipe 3 enters into a deep inner portion of the annular groove S formed in the semi-spherical pipe portion 2A of the second joint pipe 2, that is, until the end of the large-diameter straight pipe portion 3B of the third join pipe 3 extends to come into abutment against the bridging wall portion 2C of the second joint pipe 2.

Therefore, by an amount corresponding to the sum of the amount of the extension of the one end of the small-diameter straight pipe portion 3E of the third joint pipe 3 into the area W where the semi-spherical pipe portion 5A inside the fifth joint pipe 5 is formed and the amount of the extension of the one end of the large-diameter straight pipe portion 3D of the third joint pipe 3 into the annular groove S defined in the semi-spherical pipe portion 2A of the second joint pipe 2, the lengths of the straight pipe portion 2B of the second joint pipe 2, the large-diameter straight pipe portion 3D of the third joint pipe 3 and of the straight pipe portion 5B of the fifth joint pipe 5 along the direction of the pipe axis X may be reduced. As a result, it becomes possible to reserve a large extension/contraction amount available to cope with an external force such as an axial compression or tensile stress due to an earthquake or differential settlement of the earth.

Incidentally, when the fifth joint pipe 5 and the third joint pipe 3 are maximally contracted relative to each other, one end of the small-diameter straight pipe portion 3E of the third joint pipe 3 extends into the portion corresponding to the area W inside the fifth joint pipe 5 where the semi-spherical pipe portion 5A is formed. In this, the maximal extending position of the one end of the small-diameter straight pipe portion 3E is set either on a virtual spherical face Y extending about a center of sphere extending through the outer peripheral face 5a of the semi-spherical pipe portion 5A of the fifth joint pipe 5 or on the inner side than this virtual spherical face (on the side of the semi-spherical pipe portion 2A of the second joint pipe 2).

The first joint pipe 1 and the fourth joint pipe 4 of this embodiment are identical to the first joint pipe 1 and the fourth joint pipe 4 of the first embodiment and therefore are provided with same reference numerals and will not be described here.

[fourth embodiment]

Figure 7:
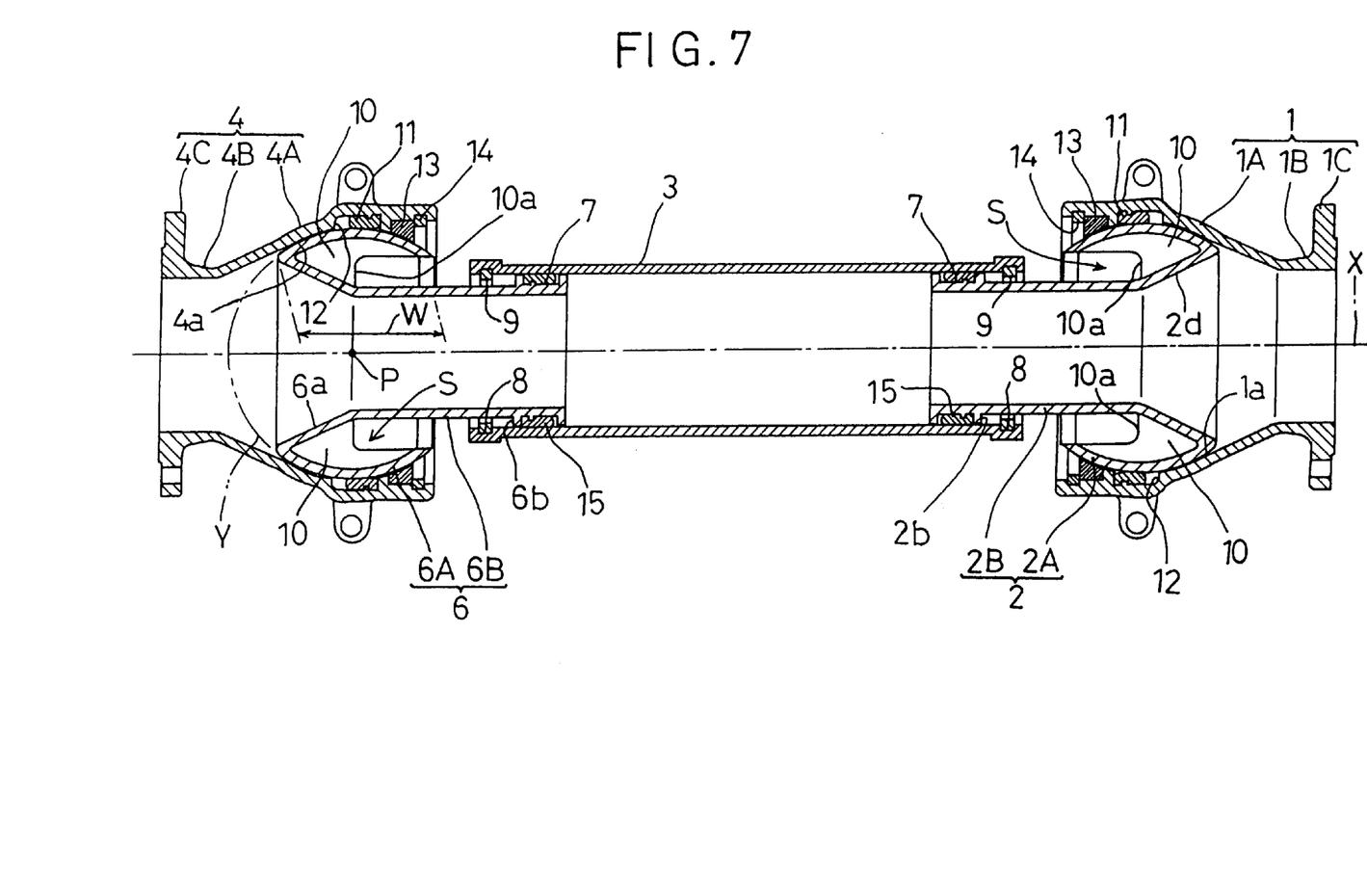
FIG. 7 is a vertical section showing an entire telescopic pivotal pipe joint relating to a fourth preferred embodiment of the present invention.

A telescopic pivotal pipe joint shown in FIG. 7 for use in fluid (e.g. water) transportation includes a first joint pipe 1 made of cast iron as a first pipe member, or outer pipe member, having a semi-spherical inner peripheral face 1a and a second joint pipe 2 made of cast iron as a second pipe member, or inner pipe member, having a semi-spherical pipe portion 2A projecting radially outward and sidable along the semi-spherical inner peripheral face 1a, with the second joint pipe 2 being slidably engaged into the first joint pipe 1. On a straight pipe portion 2B of the second joint pipe 2 co-extensive with the semi-spherical pipe portion 2A, there is fitted a third joint pipe 3 made of cast iron as a third pipe member, or connecting pipe member, telescopically sidable along a pipe axis X.

Into the other end of the third joint pipe 3, there is fitted a sixth joint pipe 6 made of cast iron as a sixth pipe member, or inner pipe member, extensively and contractively sidable along the direction of the pipe axis X. And, on the other end of the sixth joint pipe 6, there is formed a semi-spherical pipe portion 6A projecting radially outward and pivotally fitted to a semi-spherical inner peripheral face 4a of a fourth joint pipe 4 made of cast iron as a fourth pipe member, or outer pipe member.

Further, the semi-spherical pipe portion 2A of the second joint pipe 2 defines an annular groove S, into which one end of the third joint pipe 3 extends along the direction of the pipe axis X when the second joint pipe 2 and the third joint pipe 3 are maximally contracted to each other. And, the semi-spherical pipe portion 6A of the sixth joint pipe 6 defines an annular groove S, into which the other end of the third joint pipe extends along the direction of pipe axis when the third joint pipe and the sixth joint pipe are maximally contracted to each other.

Then, the relative pivotal movement along the semi-spherical face between the first joint pipe 1 and the second joint pipe 2 and also the relative pivotal movement along the semi-spherical face between the fourth joint pipe and the sixth joint pipe may effectively absorb an external force such as a shearing force or bending moment in a direction transverse to the direction of the pipe axis X. Further, as the opposed ends of the third joint pipe 3 extend into the annular groove S defined in the semi-spherical pipe portion 2A of the second joint pipe 2 and the annular groove S defined in the semi-spherical pipe portion 6A of the sixth joint pipe 6 respectively, by the amounts of the extensions of the opposed ends along the direction of the pipe axis X, the axial lengths of the straight pipe portion 2B of the second joint pipe 2, the third joint pipe 3 and the straight pipe portion 6B of the sixth joint pipe 6 may be reduced advantageously.

Therefore, while promoting the reductions in the size, weight and manufacture cost of the entire pipe joint, the extension/contraction amount to cope with an external force may be increased.

The semi-spherical pipe portion 2A of the second joint pipe 2 integrally includes, inside the annular groove S, a plurality (total six in the instant embodiment) of reinforcing ribs 10 spaced apart from each other along the peripheral direction. Further, one end (one end face) 10a of each of these reinforcing ribs 10 facing the opening of the annular groove S is constructed so as to act also as a stopper portion, which comes, along the direction of pipe axis X, into abutment against the one end of the third joint pipe 3 introduced into the annular groove S.

The semi-spherical pipe portion 6A of the sixth joint pipe 6 too integrally includes, inside the annular groove S, a plurality (total six in the instant embodiment) of reinforcing ribs 10 spaced apart from each other along the peripheral direction. Further, one end (one end face) 10a of each of these reinforcing ribs 10 facing the opening of the annular groove S is constructed so as to act also as a stopper portion, which comes, along the direction of the pipe axis X, into abutment against the other end of the third joint pipe 3 introduced into the annular groove S.

In the inner peripheral face of the straight pipe portion 2B of the second pipe member 2, an inner peripheral face portion 2d thereof at the other end adjacent the semi-spherical pipe portion 2A, that is, the inner peripheral face portion 2d extending from the leading end of the straight pipe portion 2B to the one end 10a of the reinforcing ribs 10, is formed as a tapered face having a progressively increasing diameter toward said other end (on the side of the first joint pipe). Also, in the inner peripheral face of the straight pipe portion 6B of the sixth joint pipe 6, an inner peripheral face portion 6a thereof at the other end adjacent the semi-spherical pipe portion 6A, that is, the inner peripheral face portion 6a extending from the leading end of the straight pipe portion 6B to the one end 10a of the reinforcing ribs 10 along the radial direction, is formed as a tapered face having a progressively increasing diameter toward said other end.

At an end portion of the outer peripheral face of the straight pipe portion 2B of the second pipe member 2, there is formed an annular seal retaining groove 7 for engaging and retaining therein a first elastic seal member 15 made of synthetic rubber (e.g. styrene butadiene rubber) for sealing between the inner peripheral face of the third joint pipe 3 and the outer peripheral face of the straight pipe portion 2B of the second joint pipe 2. And, at an end of the inner peripheral face of the third joint pipe 3, there is defined an annular attachment groove 8 opened inward in the direction of pipe radius. In this attachment groove 8, there is fitted a stopper member 9 made of stainless steel capable of radially extending deformation, against which one annular rib 2b constituting the seal retaining groove 7 comes into abutment along the direction of pipe axis X when the second joint pipe 2 and the third joint pipe 3 are telescopically extended maximally relative to each other along the direction of pipe axis X.

Further, at an end portion of the outer peripheral face of the straight pipe portion 6B of the sixth pipe member 6, there is formed an annular seal retaining groove 7 for engaging and retaining therein a first elastic seal member 15 made of synthetic rubber (e.g. styrene butadiene rubber) for sealing between the inner peripheral face of the third joint pipe 3 and the outer peripheral face of the straight pipe portion 6B of the sixth joint pipe 6. And, at an end of the inner peripheral face of the third joint pipe 3, there is defined an annular attachment groove 8 opened inward in the direction of pipe radius. In this attachment groove 8, there is fitted a stopper member 9 made of stainless steel capable of radially extending deformation, against which one annular rib 2b constituting the seal retaining groove 7 comes into abutment along the direction of pipe axis X when the sixth joint pipe 6 and the third joint pipe 3 are telescopically extended maximally relative to each other along the direction of pipe axis X.

The first joint pipe 1 and the fourth joint pipe 4 of this embodiment are identical to the first joint pipe 1 and the fourth joint pipe 4 of the first embodiment and therefore are provided with same reference numerals and will not be described here.

[fifth embodiment]

Figure 8:
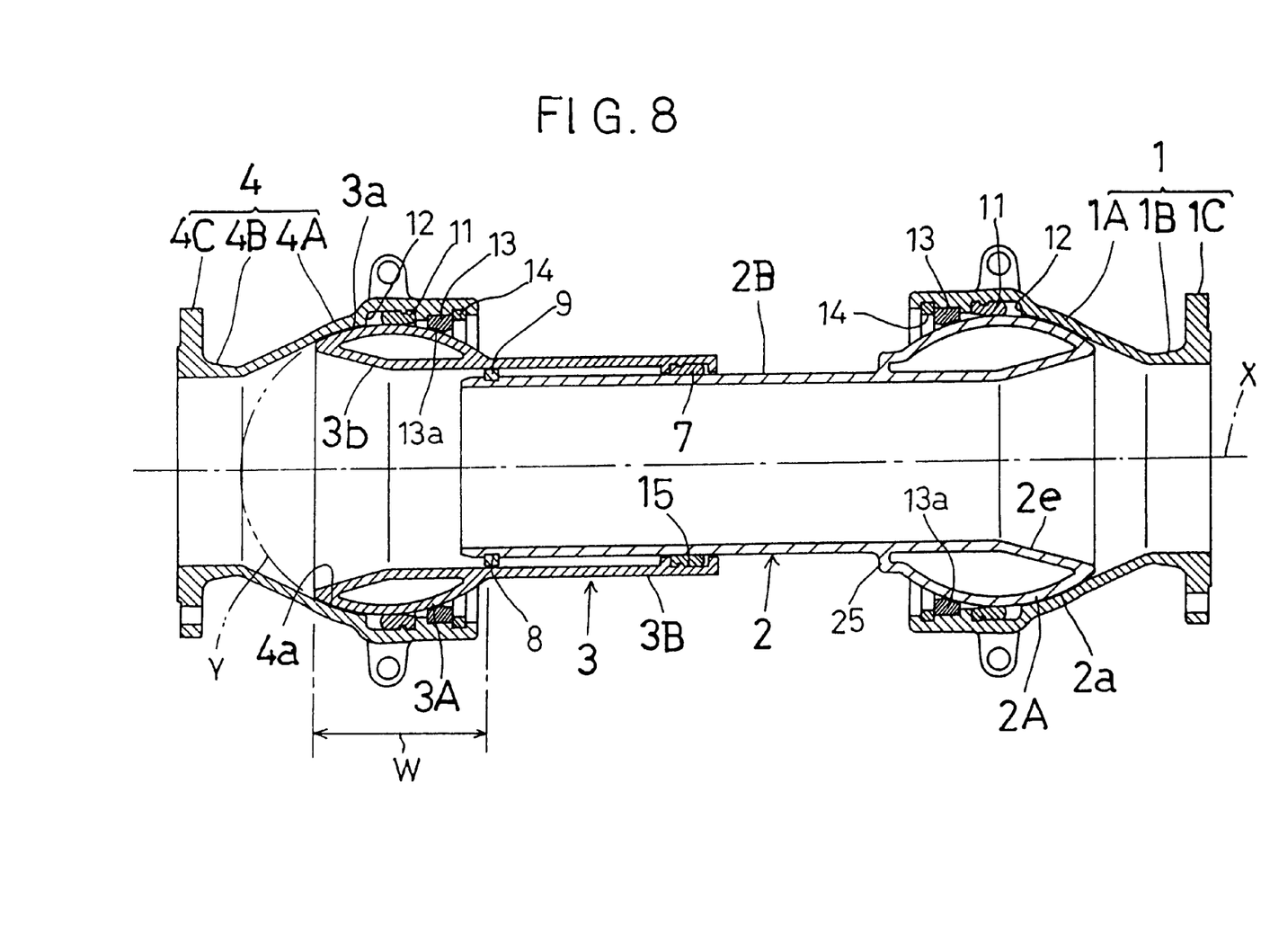
FIG. 8 is a vertical section showing an entire telescopic pivotal pipe joint relating to a fifth preferred embodiment of the present invention.

In the first embodiment described hereinbefore, when the third joint pipe 3 and the second joint pipe 2 are maximally contracted to each other, one end of the third joint pipe 3 extends into the annular groove S defined in the semi-spherical pipe portion 2A of the second joint pipe 2. Instead of this, a further construction is possible as shown in FIG. 8. In this case, in the outer peripheral face of the second joint pipe 2 and at a position corresponding to the border between the straight pipe portion 2B fitted into the straight pipe portion 3B of the third joint pipe 3 and the semi-spherical pipe portion 2A, there is formed an annular second stopper portion 25, against which the one end of the straight pipe portion 3B of the third joint pipe 3 comes into abutment along the direction of the pipe axis X when the second joint pipe 2 and the third joint pipe 3 are maximally contracted to each other.

And, in this fifth embodiment, when the second joint pipe 2 and the third joint pipe 3 are maximally contracted to each other, the one end of the second joint pipe 2 extends into the portion corresponding to the area W inside the third joint pipe 3 where the semi-spherical pipe portion 3A is formed, more particularly, at the portion where the one end of the second joint pipe 2 extends into the portion corresponding to the leading end of the semi-spherical pipe portion 3A. Therefore, by the amount of the extension of the one end of the second joint pipe 2 into the area W inside the third joint pipe 3 where the semi-spherical pipe portion 3A is formed, the lengths, along the direction of the pipe axis X, of the straight pipe portion 3B of the third joint pipe 3 and of the straight pipe portion 2B of the second joint pipe may be reduced advantageously.

Therefore, while promoting the reductions in the size, weight and manufacture cost of the entire pipe joint, the extension/contraction amount to cope with an external force may be increased.

Incidentally, in this embodiment, the seal retaining groove 7 for engaging and retaining therein the first elastic seal member 15 is defined in the inner peripheral face of the straight pipe portion 3B of the third joint pipe 3 and the attachment groove 8 for engaging and retaining the stopper member 9 is defined in the outer peripheral face of the straight pipe portion 2B of the second joint pipe 2.

In the inner peripheral face of the straight pipe portion 3B of the third joint pipe 3, an inner peripheral face portion 3b on the other end adjacent the semi-spherical pipe portion 3A is formed as a tapered face having a progressively increasing diameter toward the other end. Further, in the inner peripheral face of the straight pipe portion 2B of the second joint pipe 2, an inner peripheral face portion 2e on the other end adjacent the semi-spherical pipe portion 2A is formed as a tapered face having a progressively increasing diameter toward the other end.

And, between the inner peripheral face of the semi-spherical pipe portion 2A and the outer peripheral face opposing thereto of the inner pipe portion of the second joint pipe 2 and also between the inner peripheral face of the semi-spherical pipe portion 3A and the outer peripheral face opposing thereto of the inner pipe portion of the third joint pipe 3, there are formed annular grooves for the purpose of weight reduction.

The same constructions as those described in the foregoing first embodiment are denoted with the same reference numerals or marks and will not be described here.

[other embodiments]

In the respective embodiments described above, the first pipe member (first joint pipe) integrally includes the connecting flange 1C for fixing connection with a fluid transport pipe (e.g. water pipe), a partitioning valve or any other fluid pipe device by means of bolts and nuts. Alternatively, it is possible to adapt this first joint pipe 1 to act also as a part of such fluid pipe device.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A telescopic pivotal pipe joint, comprising:
   a first outer pipe member having a semi-spherical inner peripheral face;
   a first inner pipe member slidably engaged within the first outer pipe member and having a semi-spherical pipe portion and a straight pipe portion coextensive with the semi-spherical pipe portion, with the semi-spherical pipe portion engaged slidably with the semi-spherical inner peripheral face of the first outer pipe member, and with the semi-spherical pipe portion defining an annular groove; and
   a second inner pipe member engaged on the straight pipe portion of the first inner pipe member, with the second inner pipe member telescopically slidable in an axial direction relative to the first inner pipe member,
   wherein when the first and second inner pipe members are contracted fully relative to each other, an end of the second inner pipe member is positioned in the annular groove.

2. The telescopic pivotal pipe joint as defined in claim 1, wherein the semi-spherical pipe portion of the first inner pipe member is formed integrally with the straight pipe portion of the first inner pipe member, and wherein the annular groove is formed between an inner face of the semi-spherical pipe portion and an outer face of the straight pipe portion of the first inner pipe member.

3. The telescopic pivotal pipe joint as defined in claim 1, wherein the semi-spherical pipe portion of the first inner pipe member includes, within the annular groove thereof, a plurality of reinforcing ribs peripherally spaced apart from each other, and wherein an end of each reinforcing rib functions as a stopper for the end of the second inner pipe member introduced into the annular groove in the axial direction.

4. The telescopic pivotal pipe joint as defined in claim 1, wherein the first inner pipe member includes, at an end thereof adjacent the semi-spherical pipe portion, a tapered portion having a progressively increasing diameter toward the end of the first inner pipe member.

5. A telescopic pivotal pipe joint, comprising:
   a first outer pipe member having a semi-spherical inner peripheral face;
   a first inner pipe member slidably engaged within the first outer pipe member and having a semi-spherical pipe portion and a straight pipe portion coextensive with the semi-spherical pipe portion, with the semi-spherical pipe portion engaged slidably with the semi-spherical inner peripheral face of the first outer pipe member, and with the semi-spherical pipe portion of the first inner pipe member defining an annular groove;
   a second outer pipe member having a semi-spherical inner peripheral face;
   a second inner pipe member slidably engaged within the second outer pipe member and having a semi-spherical pipe portion and a straight pipe portion coextensive with the semi-spherical pipe portion, with the semi-spherical pipe portion of the second inner pipe member engaged slidably with the semi-spherical inner peripheral face of the second outer pipe member, and with the semi-spherical pipe portion of the second inner pipe member defining an annular groove; and
   a connecting pipe member engaged on the straight pipe portion of each of the first and second inner pipe members, with the first and second inner pipe members telescopically slidable in an axial direction relative to the connecting pipe member, and with the connecting pipe member having two ends,
   wherein when the first and second inner pipe members are contracted fully relative to the connecting pipe member, the ends of the connecting pipe member are respectively positioned in the annular groove defined by the semi-spherical pipe portion of each of the first and second inner pipe members.

6. The telescopic pivotal pipe joint as defined in claim 5, wherein the semi-spherical pipe portion of each of the first and second inner pipe members includes, within the annular groove thereof, a plurality of reinforcing ribs peripherally spaced apart from each other, and wherein an end of each reinforcing rib functions as a stopper for the respective ends of the connecting pipe member introduced in the axial direction into the annular groove defined by the semi-spherical pipe portion of each of the first and second inner pipe members.

7. The telescopic pivotal pipe joint as defined in claim 5, wherein each of the first and second inner pipe members includes, at an end thereof adjacent the semi-spherical pipe portion, a tapered portion having a progressively increasing diameter toward the end of each of the first and second inner pipe members.

8. A telescopic pivotal pipe joint, comprising:
   a first outer pipe member having a semi-spherical inner peripheral face;
   a first inner pipe member slidably engaged within the first outer pipe member and having a semi-spherical pipe portion and a straight pipe portion coextensive and formed integrally with the semi-spherical pipe portion, with the semi-spherical pipe portion engaged slidably with the semi-spherical inner peripheral face of the first outer pipe member, and with the semi-spherical pipe portion having an inner pipe portion sharing a common diameter with the straight pipe portion; and
   a second inner pipe member engaged within the straight pipe portion of the first inner pipe member, with the second inner pipe member telescopically slidable in an axial direction relative to the first inner pipe member, wherein the inner pipe portion of the semi-spherical pipe portion of the first inner pipe member guides the second inner pipe member in the axial direction when the first and second inner pipe members are contracted relative to each other, and wherein when the first and second inner pipe members are contracted fully relative to each other, an end of the second inner pipe member lies fitting within the inner pipe portion of the semi-spherical pipe portion of the first inner pipe member.

9. The telescopic pivotal pipe joint as defined in claim 8, wherein the semi-spherical pipe portion of the first inner pipe member defines a closed annular space with the inner pipe portion.

10. The telescopic pivotal pipe joint as defined in claim 8, wherein the first inner pipe member includes, at an end thereof adjacent the semi-spherical pipe portion, a tapered portion having a progressively increasing diameter toward the end of the first inner pipe member.

11. The telescopic pivotal pipe joint as defined in claim 8, further comprising:

a second outer pipe member with a semi-spherical inner peripheral face, wherein the second inner pipe member is slidably engaged within the second outer pipe member and has a semi-spherical pipe portion and a straight pipe portion coextensive with the semi-spherical pipe portion, with the semi-spherical pipe portion of the second inner pipe member engaged slidably with the semi-spherical inner peripheral face of the second outer pipe member, and with the semi-spherical pipe portion of the second inner pipe member defining an annular groove, and wherein when the first and second inner pipe members are contracted fully relative to each other, an end of the first inner pipe member is positioned in the annular groove defined by the semi-spherical pipe portion of the second inner pipe member.

12. The telescopic pivotal pipe joint as defined in claim 11, wherein the semi-spherical pipe portion of the second inner pipe member includes, within the annular groove thereof, a plurality of reinforcing ribs peripherally spaced apart from each other, and wherein an end of each reinforcing rib functions as a stopper for the end of the first inner pipe member introduced into the annular groove in the axial direction.

13. The telescopic pivotal pipe joint as defined in claim 11, wherein the second inner pipe member includes, at an end thereof adjacent the semi-spherical pipe portion, a tapered portion having a progressively increasing diameter toward the end of the second inner pipe member.

14. A telescopic pivotal pipe joint, comprising:

a first outer pipe member having a semi-spherical inner peripheral face;

a first inner pipe member slidably engaged within the first outer pipe member and having a semi-spherical pipe portion and a straight pipe portion coextensive with the semi-spherical pipe portion, with the semi-spherical pipe portion engaged slidably with the semi-spherical inner peripheral face of the first outer pipe member, and with the semi-spherical pipe portion of the first inner pipe member defining an annular groove;

a second outer pipe member having a semi-spherical inner face;

a second inner pipe member slidably engaged within the second outer pipe member and having a semi-spherical pipe portion and a straight pipe portion coextensive with the semi-spherical pipe portion, with the semi-spherical pipe portion of the second inner pipe member engaged slidably with the semi-spherical inner peripheral face of the second outer pipe member, and with the semi-spherical pipe portion of the second inner pipe member having an inner pipe portion sharing a common diameter with the straight pipe portion of the second inner pipe member; and a connecting pipe member having a first straight pipe portion and a second straight pipe portion of smaller diameter than the first straight pipe portion, with the first straight pipe portion engaged on the straight pipe portion of the first inner pipe member and the second straight pipe portion engaged within the straight pipe portion of the second inner pipe member, and with the first and second inner pipe members telescopically slidable in an axial direction relative to the connecting pipe member, wherein when the first and second inner pipe members are contracted fully relative to the connecting pipe member, an end of the first straight pipe portion is positioned in the annular groove defined by the semi-spherical pipe portion of the first inner pipe member and an end of the second straight pipe portion lies coextensive with the inner pipe portion of the semi-spherical pipe portion of the second inner pipe member.

* * * * *